T. H. DE HAVEN.
AUXILIARY SPADE HANDLE.
APPLICATION FILED APR. 15, 1912.
1,037,734.
Patented Sept. 3, 1912.
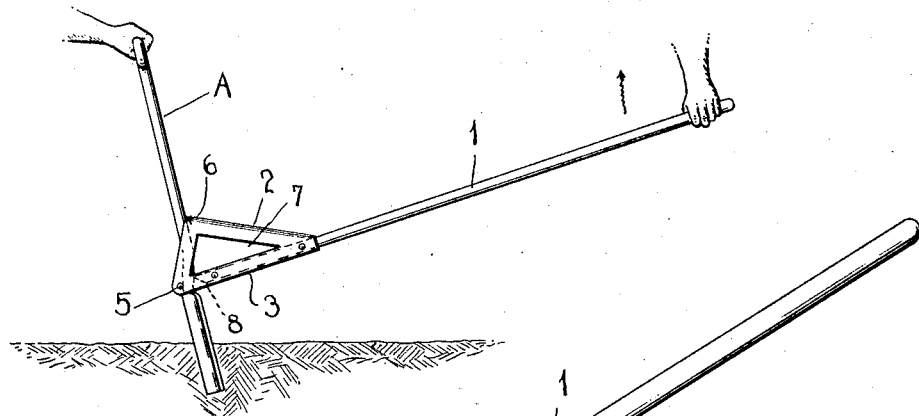
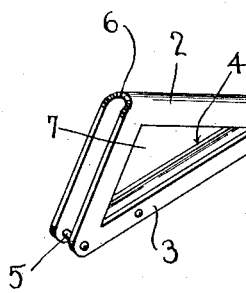
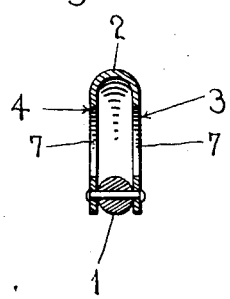
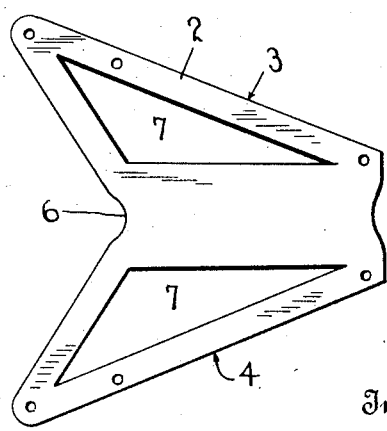
Inventor
T. H. DeHaven
Witnesses

UNITED STATES PATENT OFFICE.

THOMAS H. DE HAVEN, OF BELLINGHAM, WASHINGTON.

AUXILIARY SPADE-HANDLE.

1,037,734.   Specification of Letters Patent.   Patented Sept. 3, 1912.

Application filed April 15, 1912. Serial No. 690,914.

*To all whom it may concern:*

Be it known that I, THOMAS H. DE HAVEN, a citizen of the United States, residing at Bellingham, in the county of Whatcom and State of Washington, have invented certain new and useful Improvements in Auxiliary Spade-Handles; and I do declare the following to be a full, clear, and exact description of the invention, such as will enable others skilled in the art to which it appertains to make and use the same.

This invention relates to an auxiliary spade or shovel operating handle.

The object of the invention is to provide a simple and efficient removable attachment for shovel or spade handles especially designed for use in filling ditches, but it is capable of employment for various other purposes, and which may be applied to any spade, shovel or fork handle.

Another object is to provide an attachment of this character whereby a leverage is produced which permits a large quantity of dirt to be moved with least effort.

This device is designed to be operated by two men, who can, by the use thereof, accomplish as much work in the same time as four men with ordinary shovels without the attachment.

With these and other objects in view, the invention consists of certain novel features of construction, and the combination and arrangement of parts as will be more fully described and claimed.

In the accompanying drawings: Figure 1 represents a side elevation of this invention applied and in use; Fig. 2 is a detail perspective view of the attachment detached; Fig. 3 is a transverse section through the attached end of the auxiliary handle; Fig. 4 is a plan view of the blank from which the attachment is formed.

In the embodiment illustrated, a handle 1 is shown which may be of any desired length and composed of any suitable material, preferably wood. It is equipped at one end with attaching means, here shown in the form of a triangular member 2 in the form of a metal plate folded from one corner through the body of the plate to a point midway between the corners, thereby producing laterally spaced side plates 3 and 4 which are also triangular in shape, and the free oppositely disposed corners of which are secured together, preferably by a bolt 5 which passes through registering apertures in the said corners and is designed to connect the attachment to a shovel handle A as shown in Fig. 1. This shovel handle passes between the plates or side members 3 and 4 and the bolt arranged at the rear of said handle, the folded portion being preferably notched, as shown at 6, to engage the handle A at a point above the spade or shovel blade and bear thereon, whereby sufficient force is exerted on the shovel to cause the blade thereof to move forward and carry the earth in front of it. The handle 1 is arranged longitudinally between the free lower edges of the members 3 and 4 and is rigidly secured therein by means of bolts or otherwise. The side plates 3 and 4 are preferably cut out centrally to reduce the weight of the attachment, as shown at 7.

In the operation of this device, the member 2 is applied to the shovel handle A by first removing the bolt 5 and inserting said handle A between the open ends of the plates 3 and 4 and then again placing the bolt in operative engagement with said plates. The upward movement of the handle 1 will then cause the notch 6 thereof to bear against the handle A, as shown in Fig. 1, causing the shovel blade to move forward and carry with it all dirt or earth in front of it. It will be obvious that this operation may be repeated as many times as desired, the operator of the handle 1 assisting in moving the shovel backward as well as forward. Thus a large amount of earth may be moved with the expenditure of a small amount of strength. The end of the handle 1 which is arranged between the plates 3 and 4 terminates at a point spaced from the outer end of said plates, and is preferably beveled on its lower face, as shown at 8, to adapt the device to move downward on the shovel handle.

While this device is described as applied to a spade for filling ditches, it is obvious that it may be used for removing dirt, manure or other material for other purposes.

I claim as my invention:

1. An auxiliary shovel operating handle comprising a handle member provided at one end with laterally spaced plates projecting beyond said handle member and provided with means for attaching them to a shovel handle, said plates projecting laterally beyond one side of said handle member and connected at their free end, said free end being adapted to engage the shovel handle when in operative position.

2. A shovel operating device comprising a handle member, plates secured to opposite sides of said handle member and projecting beyond one end thereof, means for connecting said plates at a point beyond said handle end to form an opening for receiving the shovel handle, said plates extending laterally beyond one side of said handle member and connected at their outer ends to form shovel handle engaging means.

3. A shovel operating attachment comprising laterally spaced triangular members connected along one edge and having a handle member inserted between the oppositely disposed edges and secured rigidly thereto, the outer ends of said triangular members projecting beyond the outer end of the handle and having registering apertures therein, a bolt removably secured in said apertures, and means at the outer connected edge of said attachment for engaging the shovel handle.

In testimony whereof I have hereunto set my hand in presence of two subscribing witnesses.

THOMAS H. DE HAVEN.

Witnesses:
J. T. MOORE,
S. H. BIRCHVELL.

Copies of this patent may be obtained for five cents each, by addressing the "Commissioner of Patents, Washington, D. C."